(12) United States Patent
Seavey Audette

(10) Patent No.: US 9,345,230 B1
(45) Date of Patent: May 24, 2016

(54) ANIMAL FEEDER

(71) Applicant: Tracie Beth Seavey Audette, Wayne, OK (US)

(72) Inventor: Tracie Beth Seavey Audette, Wayne, OK (US)

( * ) Notice: Subject to any disclaimer, the term of this patent is extended or adjusted under 35 U.S.C. 154(b) by 227 days.

(21) Appl. No.: 14/077,792

(22) Filed: Nov. 12, 2013

(51) Int. Cl.
*A01K 5/01* (2006.01)

(52) U.S. Cl.
CPC .................................. *A01K 5/01* (2013.01)

(58) Field of Classification Search
CPC ......... A01K 5/01; A01K 1/10; A01K 1/0114; A01K 1/0107; A01K 1/011; Y10S 119/90; B65D 88/34; B65D 81/245
See application file for complete search history.

(56) References Cited

U.S. PATENT DOCUMENTS

| | | | | | |
|---|---|---|---|---|---|
| 1,089,011 | A | * | 3/1914 | Ruggles | A01K 39/014 119/61.3 |
| 1,287,773 | A | * | 12/1918 | Schumacher | A01K 1/10 119/60 |
| 3,589,340 | A | * | 6/1971 | Beliles | A01K 5/01 119/61.54 |
| 3,908,597 | A | * | 9/1975 | Taylor | A01K 1/0114 119/166 |
| 4,030,448 | A | * | 6/1977 | Nuttall | A01K 1/0107 119/165 |
| 4,784,082 | A | * | 11/1988 | Wolfe | A01K 1/0107 119/167 |
| 5,211,133 | A | * | 5/1993 | Foley | A01K 1/0114 119/165 |
| 5,454,349 | A | * | 10/1995 | Bondurant, III | A01K 1/0114 119/166 |
| 5,509,377 | A | | 4/1996 | Franklin | |
| 5,531,186 | A | * | 7/1996 | Flood | A01K 1/0114 119/166 |
| 5,699,754 | A | * | 12/1997 | Cahajla | A01K 1/0114 119/165 |
| 5,785,000 | A | * | 7/1998 | Barbary | A01K 1/0114 119/166 |
| 5,887,544 | A | * | 3/1999 | Popelier | A01K 5/01 119/61.54 |
| 6,951,189 | B1 | * | 10/2005 | Lienemann | A01K 5/01 119/58 |
| 7,753,000 | B1 | | 7/2010 | Turner | |
| 7,798,100 | B2 | | 9/2010 | Bryant | |
| 8,082,882 | B1 | | 12/2011 | Tharp | |
| 8,342,128 | B2 | * | 1/2013 | Rocker | A01K 5/0114 119/61.2 |
| 8,887,665 | B2 | * | 11/2014 | Rocker | A01K 5/0128 119/61.2 |
| 8,950,595 | B2 | * | 2/2015 | Ammon | A47L 15/50 206/509 |
| 2010/0043717 | A1 | * | 2/2010 | Walker | A01K 1/0114 119/167 |
| 2010/0263597 | A1 | | 10/2010 | Kerns | |
| 2012/0186526 | A1 | * | 7/2012 | Olson | A01K 5/01 119/61.3 |
| 2016/0007562 | A1 | * | 1/2016 | Johnson | A01K 5/01 119/60 |

FOREIGN PATENT DOCUMENTS

EP      0005881 B1    9/1983
EP      0950351 A1   10/1999

* cited by examiner

*Primary Examiner* — Kathleen Alker
(74) *Attorney, Agent, or Firm* — Molly D. McKay

(57) ABSTRACT

An animal feeder constructed of an open top feed bin with a bumper secured to the top edge of the bin. The bumper has a wide rounded or beveled top edge to discourage animals from chewing on it. A horizontal slot in the side of the bumper is provided to admit an open work panel to be inserted through the slot and into the open top of the bin. Once within the bin, the panel rest on the feed contained within the bin. Openings provided with the panel allow an animal to access the feed. The openings can be custom sized. The panel can be removed from the bin via the slot so that the bin can be refilled with feed. An optional cover can be attached to the top of the bumper to protect the feed from the weather or to prevent access to the feed by animals.

5 Claims, 4 Drawing Sheets

ANIMAL FEEDER

BACKGROUND OF THE INVENTION

1. Field of the Invention

The present invention is a cover and grate or open work panel for an agricultural bin type animal feeder and the combination of cover, grate or open work panel and bin.

2. Description of the Related Art

Hay feeders and feed containers are routinely used to feed livestock. These feeders vary in shape, size and construction and are normally constructed of metal or a composite plastic material. These feeders and containers are basically enclosures or bins with open tops into which the feed is placed. Examples of types of feed that are placed into these bins include hay, forage or silage. To eat the feed, the animal will extend their head over the side of the bin to reach the feed via the open top of the bin. One such open top agricultural bin is sold by Decade Products of Grand Rapids, Mich.

Alternately, instead of employing open top bins, some feeders also have various forms of feed restrictors that run along guided paths or are integrated into the design of a complete feeder. These feeders can be expensive and are often hard to load with feed, particularly those that are loaded from the bottom instead of from the top.

There are numerous problems with use of open top bins for animal feeders. First, animals will routinely chew and damage the edges of non-metallic feeders, which are relatively expensive to replace. Metallic feeders, while being more resistant to chewing, inevitably rust and degrade when exposed to the elements.

Also, open top feeders tend to be wasteful of feed. Animals can easily pull out more feed from the bin than they eat, scattering the extra feed on the ground where it is trampled underfoot. Another problem with use of these open top bins for feeding animals is that a strong wind can blow the feed out of the open top of the bin and scatter it over the field or even blow it into a neighboring pasture.

Additionally, if the rancher or farmer wishes to restrict the amount of feed eaten by the livestock, they must buy an entirely new feeder for that purpose, which is expensive.

The present invention solves these problems by providing a relatively inexpensive bumper this is custom fit to a preexisting agricultural bin and which keeps the edges of the expensive bin from being chewed and damaged. The bumper is also designed to discourage animal chewing on the bumper itself to extend the bumper's useful life. The design includes a wider, rounded or beveled top edge on the bumper that is more difficult for animals to chew.

The bumper is designed with a slot in the side through which the farmer or rancher may place a grate or an open work panel that then will rest on top of the feed. The slot is formed between the bumper and the top edge of the bin. Although the invention is described as including one slot in one side of the bumper, the invention is not so limited and there can be slots on two, three or all four sides of the bumper.

The open work panel is custom sized to be slightly smaller than the interior opening of the preexisting agricultural bin so that the panel is free to move downward within the feeder as the feed is removed by the animals. Yet the open work panel is sized to be larger than the inner opening of the bumper so that it cannot be removed from the bumper by an animal by simply lifting upward on it. Instead, the open work panel can only be removed from the bumper by lifting the panel upward to align the panel with the slot in the side of the bumper and then moving the panel sideways through the slot.

The openwork panel is provided with openings that extend through the panel and are designed to allow an animal to reach through the openings to pull feed out of the bin through the openings in the panel. The openings in the panel can be customized to the user's specification. Panels can be constructed with the openings of any shape, size, and arrangement. Openings may be of standard geometric shapes such as circles or slots or may be shaped in the form of the user's initials, logo, or other user specified shapes or designs.

SUMMARY OF THE INVENTION

The present invention is an animal feeder constructed of an open top agricultural bin which has a bumper secured to the top edge of the bin. The bumper is designed with a wide rounded or beveled top edge to discourage animals from chewing on the bumper.

The bumper is provided with a horizontal slot in the side through which an open work panel can be inserted into the open top of the bin. The panel is provided with openings therein through which an animal can access feed on which the panel rests once it is inserted into the open top of the bin.

The open work panel is sized to be slightly smaller than the interior opening of the agricultural bin so that the panel is free to move downward within the feeder as the feed on which the panel rests is gradually removed and eaten by the animals. The panel is sized to be larger than the inner opening of the bumper so that it cannot be removed from the bumper by an animal by simply lifting upward on it. The open work panel can only be removed from the bumper by lifting the panel upward to align the panel with the slot in the side of the bumper and then moving the panel sideways through the slot.

The openings in the panel can be customized to the user's specification. Panels can be constructed with the openings of any shape, size, and arrangement. Openings may be of standard geometric shapes such as circles or slots or may be shaped in the form of the user's initials, logo, or other user specified shapes or designs.

An optional cover can be attached to the top of the bumper to protect the feed from the weather or to prevent access to the feed by animals.

DETAILED DESCRIPTION OF THE PREFERRED EMBODIMENT

Figure 1:
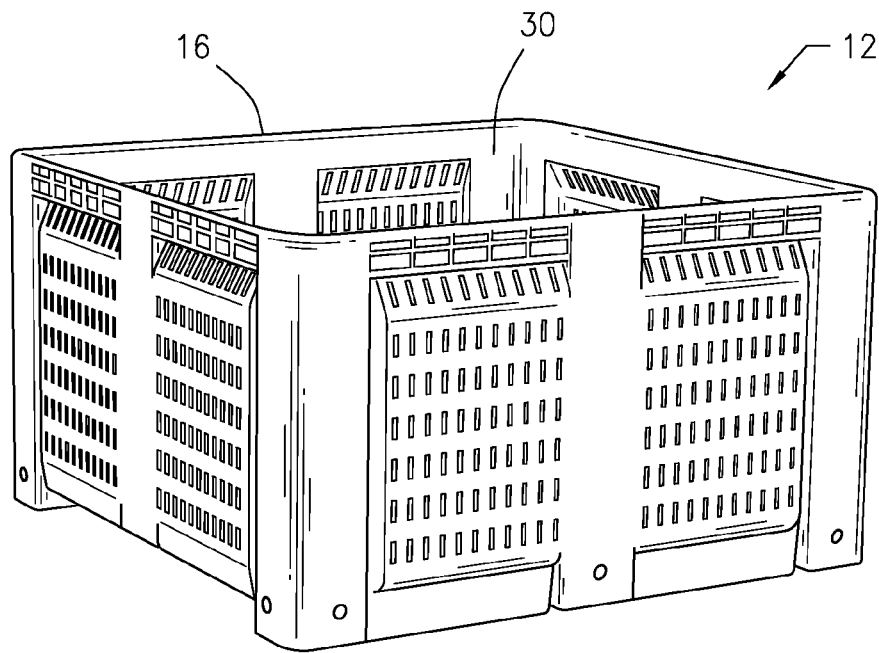
FIG. 1 is a perspective view of a prior art open top agricultural bin that is used for feeding animals.
Figure 2:
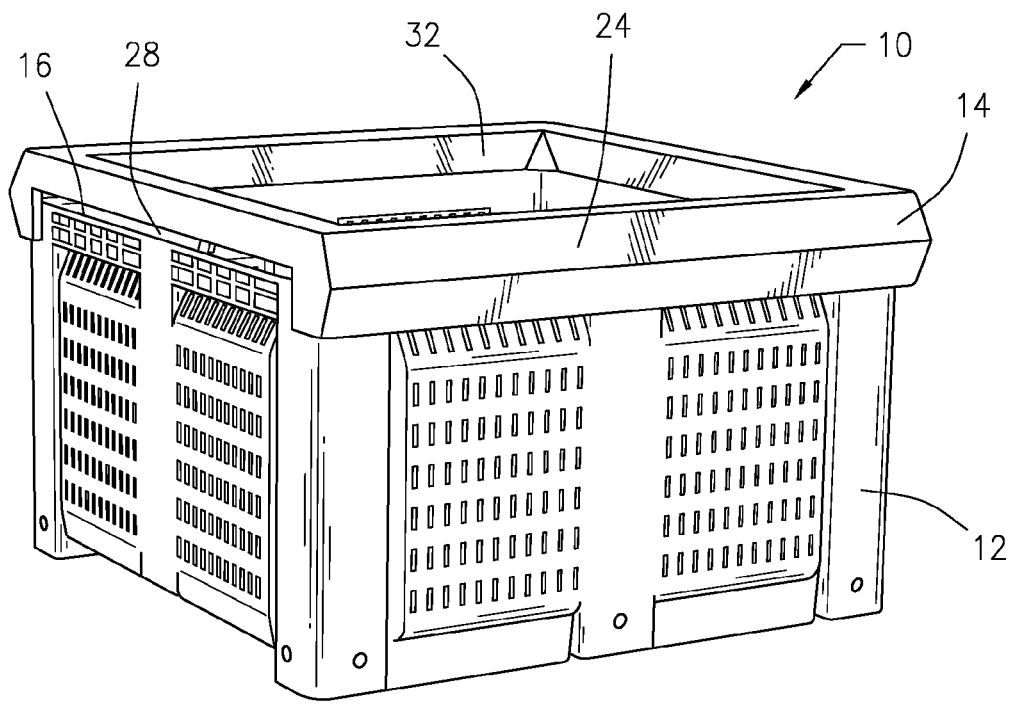
FIG. 2 is a perspective view of an animal feeder constructed in accordance with a preferred embodiment of the present invention that employs the bin of FIG. 1 to which has been added a bumper and an open work panel.
Figure 3:
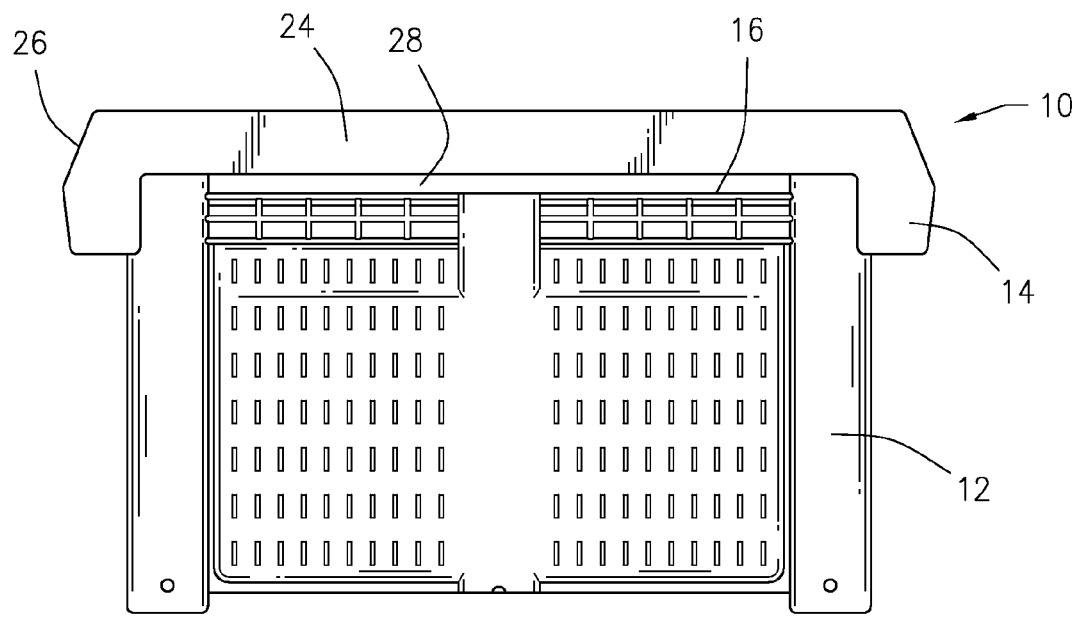
FIG. 3 is a front plan view of the animal feeder of FIG. 2.

Referring now to the drawing and initially to FIGS. 2 and 3, there is illustrated an animal feeder 10 that is constructed in accordance with a preferred embodiment of the present invention. The feeder 10 is constructed of an open top agricultural bin 12, such as the one shown in FIG. 1, which has a bumper 14 secured to the top edge 16 of the bin 12 and is used with an open work panel 18, as will be hereafter explained in more detail.

Figure 4:
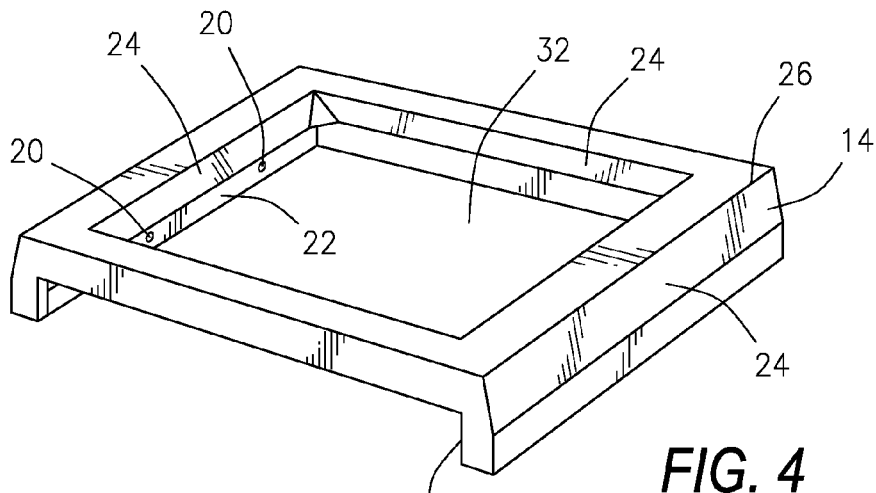
FIG. 4 is a perspective view of the bumper of FIG. 2 shown removed from the bin.

The bumper 14 is secured to the top edge 16 of the bin 12, preferably by bolts (not illustrated) that engage nuts 20 that are molded into an interior surface 22 on the sides 24 of the bumper 14, as shown in FIG. 4, but the invention is not so limited and any appropriate means may be employed for securing the bumper 14 to the bin 12. The bumper 14 has a central access opening 32.

Figure 5:
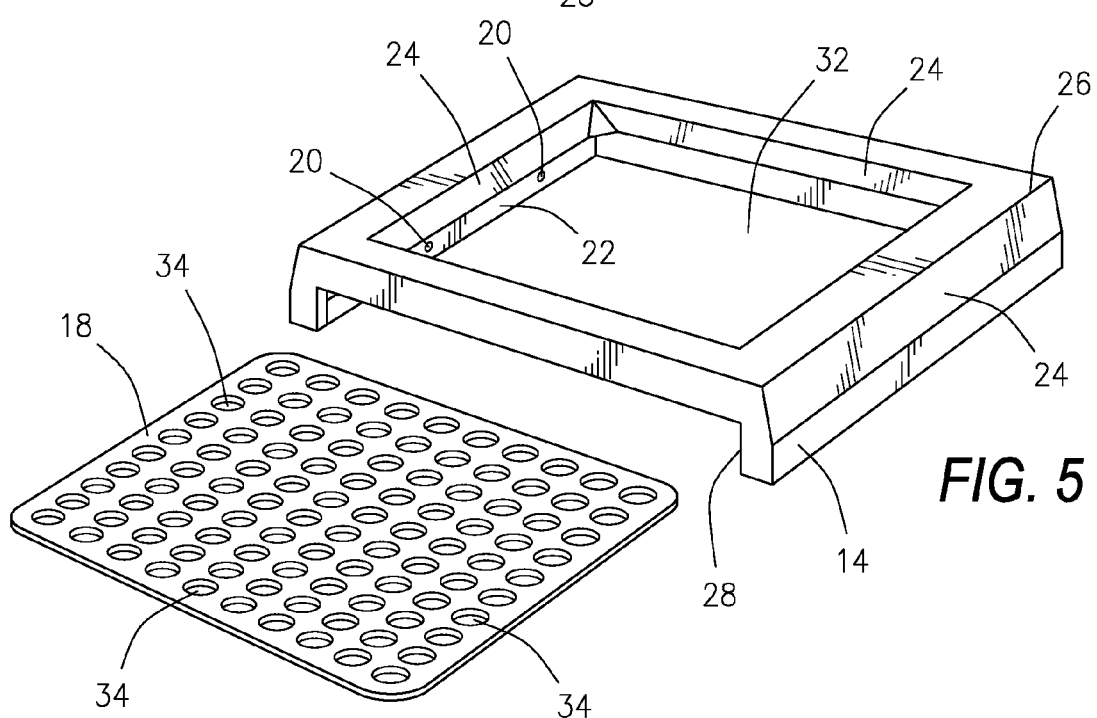
FIG. 5 is the bumper of FIG. 4 shown with the open work panel about to be inserted through a slot provided in the bumper.
Figure 6:
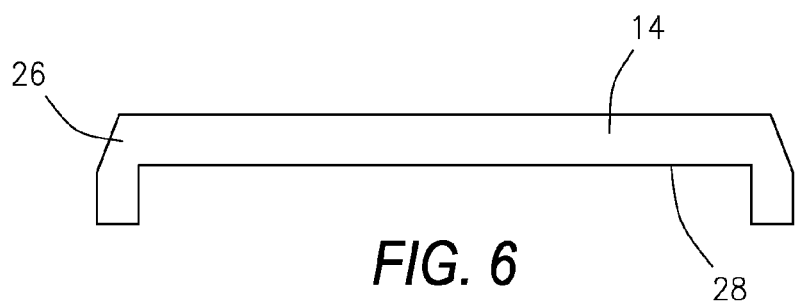
FIG. 6 is a front plan view of the bumper of FIG. 4 showing the slot through which the open work panel inserts.
Figure 7:
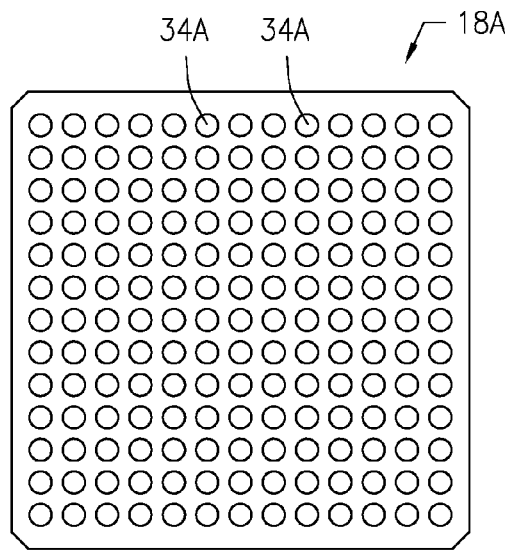
FIG. 7 is a first embodiment open work panel for use on the invention.
Figure 9:
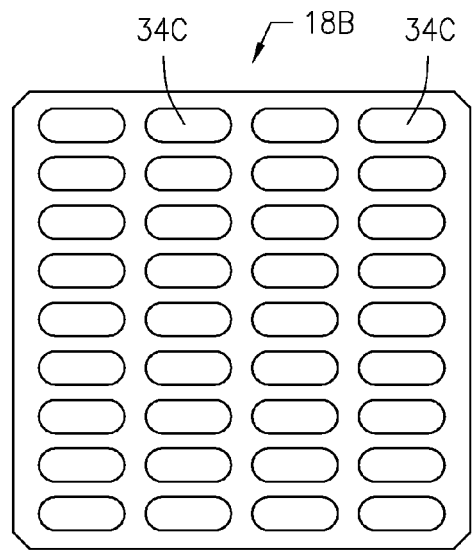
FIG. 9 is a third alternate embodiment open work panel for use on the invention.
Figure 8:
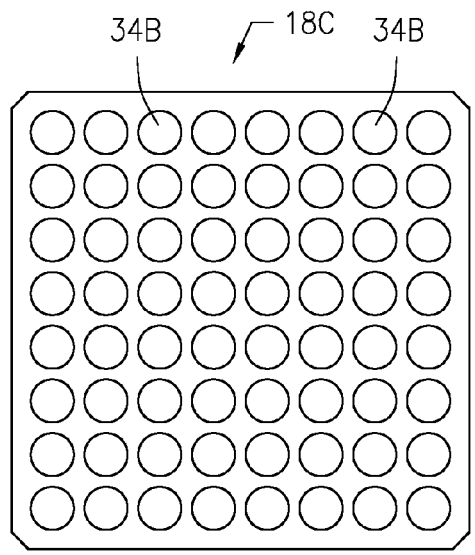
FIG. 8 is a second alternate embodiment open work panel for use on the invention.
Figure 10:
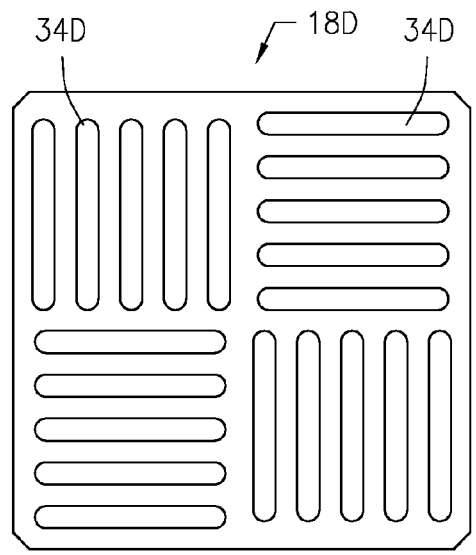
FIG. 10 is a fourth alternate embodiment open work panel for use on the invention.

The bumper 14 is illustrated in FIGS. 4 and 6. The bumper 14 is designed with a wide rounded or beveled top edge 26 designed to discourage animals from chewing on the bumper 14. The bumper 14 is provided with at least one slot 28 in a side 24 of the bumper 14. Although the invention is herein described as including one slot 28 in one side 24 of the bumper 14, the invention is not so limited and there can be slots on two, three or all four sides of the bumper 14. As shown in FIG. 5, each slot 28 is sized to admit an open work panel 18. The panel 18 inserts through the slot 28 in order to place the panel 18 into the open top 30 of the bin 12 so that the panel 18 rests on top of feed that has previously been placed within the bin 12.

The open work panel 18 is sized to be slightly smaller than the open top or interior opening 30 of the bin 12 so that the panel 18 is free to move downward within the bin 12 of the feeder 10 as the feed on which the panel 18 rests is gradually removed and eaten by animals and so that the panel 18 is free to move upward when it is time to remove it from the feeder 10 so that the bin 12 can be refilled with feed.

Also, the panel 18 is sized to be larger than the central access opening 32 provided in the bumper 14 so that it cannot be removed from the bumper 14 by an animal by simply lifting upward on it. The open work panel 18 can only be removed from the bumper 14 by lifting the panel 18 upward to align the panel 18 with the slot 28 in the side of the bumper 14 and then moving the panel 18 sideways through the slot 28.

The panel 18 is provided with openings 34 that extend through the panel 18 and through which an animal can access feed on which the panel 18 rests once the panel 18 is inserted into the open top of the bin 12.

Referring to FIGS. 7-10, the openings 34A, 34B, 34C and 35D in the panels 18A, 18B, 18C and 18D can be customized to the user's specification. Panels 18 can be constructed with the openings 34 of any shape, size, and arrangement. Openings 34 may be of standard geometric shapes such as the circles 34A and 34B shown in FIGS. 7 and 8 or the slots 34C and 34D shown in FIGS. 9 and 10 or may be shaped in the form of the user's initials, logo, or other user specified shapes or designs (not illustrated).

Figure 11:
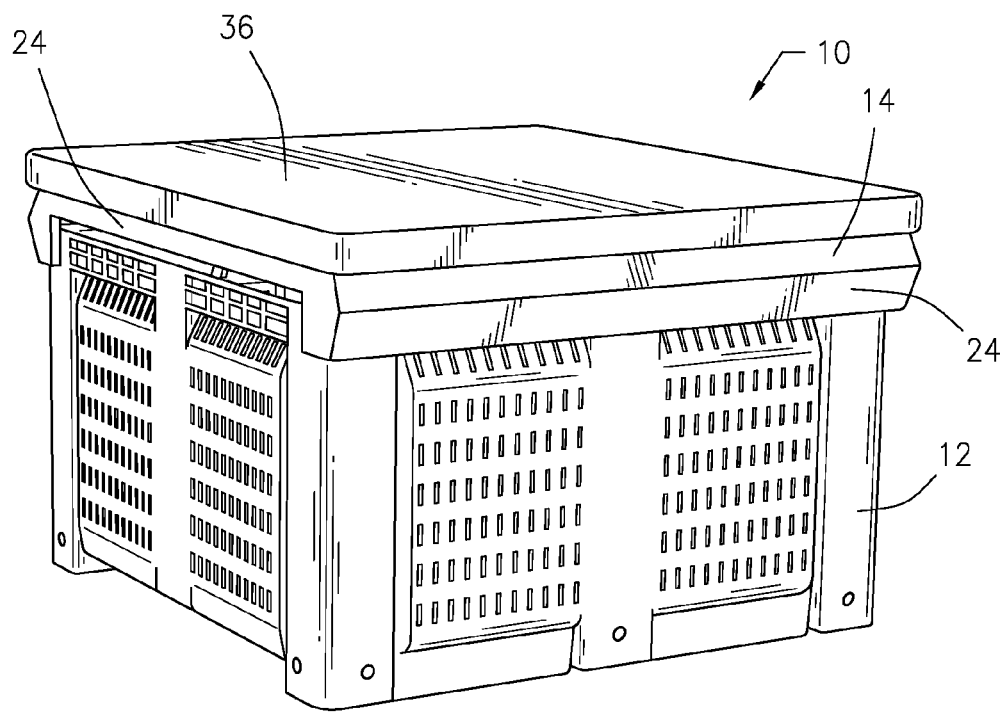
FIG. 11 is a perspective view of the feeder of FIGS. 2 and 3 shown with a cover attached over the bumper.

As shown in FIG. 11, an optional cover 36 can be attached to the top edge 16 of the bumper 14 to protect the feed contained within the feeder 10 from the weather or to prevent access to the feed by animals.

Although the invention has been illustrated and described in association with a standard size agricultural bin, the invention is not so limited. The bumper 14, the open work panel 18, and the optional cover 36 cover can all be made to fit different sizes of agricultural bins in order to meet the needs of the customer.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. An animal feeder comprising:
    a panel, and
    a bumper having a central access opening in its top and designed to secure to a top edge of an open top feed bin, the bumper having at least one horizontal slit in one of its sides such that the at least one slit is sufficiently large to admit said panel through the slit and into the open top feed bin to which the bumper is designed to secure,
    said at least one slit receiving said panel, said panel being smaller than the inside dimension of the open top feed bin to which the bumper is designed to secure, and said panel being larger than the central access opening provided in the bumper so that the panel disengages the bumper once it is admitted through the at least one slit and is located under the central access opening in the top of the bumper,
    said panel being provided with openings there through which allow an animal to access feed located under the panel through the openings in the panel, and
    said panel being freely movable beneath the bumper such that it moves downward from the bumper under the influence of gravity as feed is removed from beneath the panel by an animal.

2. An animal feeder according to claim 1 further comprising:
    an open top feed bin,
    said bumper securing to a top edge of said bin, and
    said panel freely movable between the bumper and a bottom of the feed bin.

3. An animal feeder according to claim 2 further comprising:
    said bumper having a wide top edge to protect the top edge of the bin and to discourage animals from chewing on it.

4. An animal feeder according to claim 3 further comprising:
    said top edge of the bumper being beveled.

5. An animal feeder according to claim 2 further comprising:
    a cover attachable to the top of the bumper.

* * * * *